United States Patent
Liang

(10) Patent No.: US 7,657,418 B2
(45) Date of Patent: Feb. 2, 2010

(54) MODERN TESTING SYSTEM AND METHOD

(75) Inventor: Ying-Ming Liang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 939 days.

(21) Appl. No.: 11/322,871

(22) Filed: Dec. 30, 2005

(65) Prior Publication Data

US 2006/0233228 A1 Oct. 19, 2006

(30) Foreign Application Priority Data

Apr. 15, 2005 (CN) ............... 200510034294

(51) Int. Cl.
*G06F 9/45* (2006.01)
*H04B 3/46* (2006.01)

(52) U.S. Cl. ............... 703/22; 375/219; 375/224; 375/225; 375/227; 379/9; 379/10.01; 379/12; 379/28; 709/249

(58) Field of Classification Search ............... 703/22; 375/219, 22, 224, 225, 227, 316, 346; 379/26.01, 379/9, 10.01, 12, 15.01, 28, 29.01, 29.02; 709/249

See application file for complete search history.

(56) References Cited

U.S. PATENT DOCUMENTS 6,044,107 A * 3/2000 Gatherer et al. ............ 375/222
6,266,395 B1 * 7/2001 Liu et al. ................. 379/27.01
6,690,720 B1 2/2004 Downey

OTHER PUBLICATIONS

Akujuobi, C. M.; Alam, S.: "Development of an automation process for ADSL interoperability and reliability tests" Proceedings of Thirty-Seventh Southeastern Symposium on System Theory, Mar. 20, 2005, pp. 239-243, XP009070266.
AWARE: "CPE Interoperability testing using DSL forum TR-048" White Paper, 2002, XP002392488, pp. 12-16.
DSL Forum: "ADSL Interoperability Test Plan" Technical Report TR-048, Apr. 2002, XP002392489 sentences 67-86 sentences 107-118.

* cited by examiner

*Primary Examiner*—Kamini Shah
*Assistant Examiner*—Saif Alhija
(74) *Attorney, Agent, or Firm*—Frank R. Niranjan

(57) ABSTRACT

A modem testing system is provided for testing interoperability of plural items of customer premises equipment (CPEs) (10) and plural central offices (COs) (60). The modem testing system includes a line simulator (50), a switch (40), and a controller (30). The line simulator is connected to the CPEs and COs for simulating various types of lines and noise statuses. The switch is connected to the line simulator, the CPEs, and the COs for switching connections between the CPEs and the COs. The controller is connected to the line simulator, the switch, the CPEs, and the COs for controlling the switch to set up communications between the CPEs and the COs according to a mapping list, and controlling the line simulator to simulate various types of lines and noises statuses. An exemplary modem testing method is also provided.

20 Claims, 5 Drawing Sheets

MODERN TESTING SYSTEM AND METHOD

BACKGROUND

1. Field of the Invention

The present invention pertains to network device testing systems and methods, and particularly to modem testing systems and methods.

2. Related Art

In the area of network communications, a central office (CO) and customer premises equipment (CPE) are dynamically interoperable if they have common and compatible features, functions and options. The CPE and the CO can provide satisfactory mutual communication in a real network architecture environment if a proper performance test can be applied beforehand. The test conditions need to be appropriately selected and varied during testing. Therefore, it is very important for a modem manufacturer to set up a proper test platform to test interoperability between the CO and the CPE.

A typical modem testing system includes a processor, and a line simulator interposed between the CPE and the CO. The processor is for controlling the line simulator to simulate a line length, controlling the CPE to train with the CO, and saving data related to the modem training.

The aforementioned modem testing system can only be used for testing a single CPE with a single CO at one time. It cannot be used for testing multiple CPEs with multiple COs. Thus, the efficiency of testing is low.

Therefore, a heretofore unaddressed need exists in the industry to overcome the aforementioned deficiencies and inadequacies.

SUMMARY

An exemplary modem testing system is provided, for testing interoperability of plural items of customer premises equipment (CPEs) and plural central offices (COs). The modem testing system includes a line simulator, a switch, and a controller. The line simulator is connected to the CPEs and COs for simulating various types of lines and noise statuses. The switch is connected to the line simulator, the CPEs, and the COs for switching connections between the CPEs and the COs. The controller is connected to the line simulator, the switch, the CPEs, and the COs, for controlling the switch to set up communications between the CPEs and the COs according to a mapping list, and controlling the line simulator to simulate various types of lines and noises statuses.

An exemplary modem testing method is also provided. The modem testing method is performed with a modem testing system including a switch, a line simulator, and a controller. The controller is for controlling a plurality of items of customer premises equipment (CPEs) and a plurality of central offices (COs). The modem testing method includes: loading testing specifications; setting up a mapping list of the CPEs and the COs; selecting testing specifications, and defining process values; setting up connections between the CPEs and the COs; simulating various types of lines and noise statuses; capturing and calculating bit error rates (BERs) of link data; displaying the link data, and testing results of amounts, if any, of one or more CPEs that fail the testing process and one or more IDs of the failed CPEs; and checking one or more of the process values in order to validate whether the whole testing process is completed.

Other advantages and novel features will be drawn from the following detailed description of exemplary embodiments with the attached drawings, in which:

DETAILED DESCRIPTION OF THE EMBODIMENTS

In the following description, for the purposes of conveniently explaining various embodiments, the following meanings of terms are assumed. The term "CPE" represents various types of modems such as analog modems and xDSL (Digital Subscriber Line) modems. The term "CO" represents a DSLAM unit or a DLC (Digital Line Carrier) based central office terminal unit.

Figure 1:
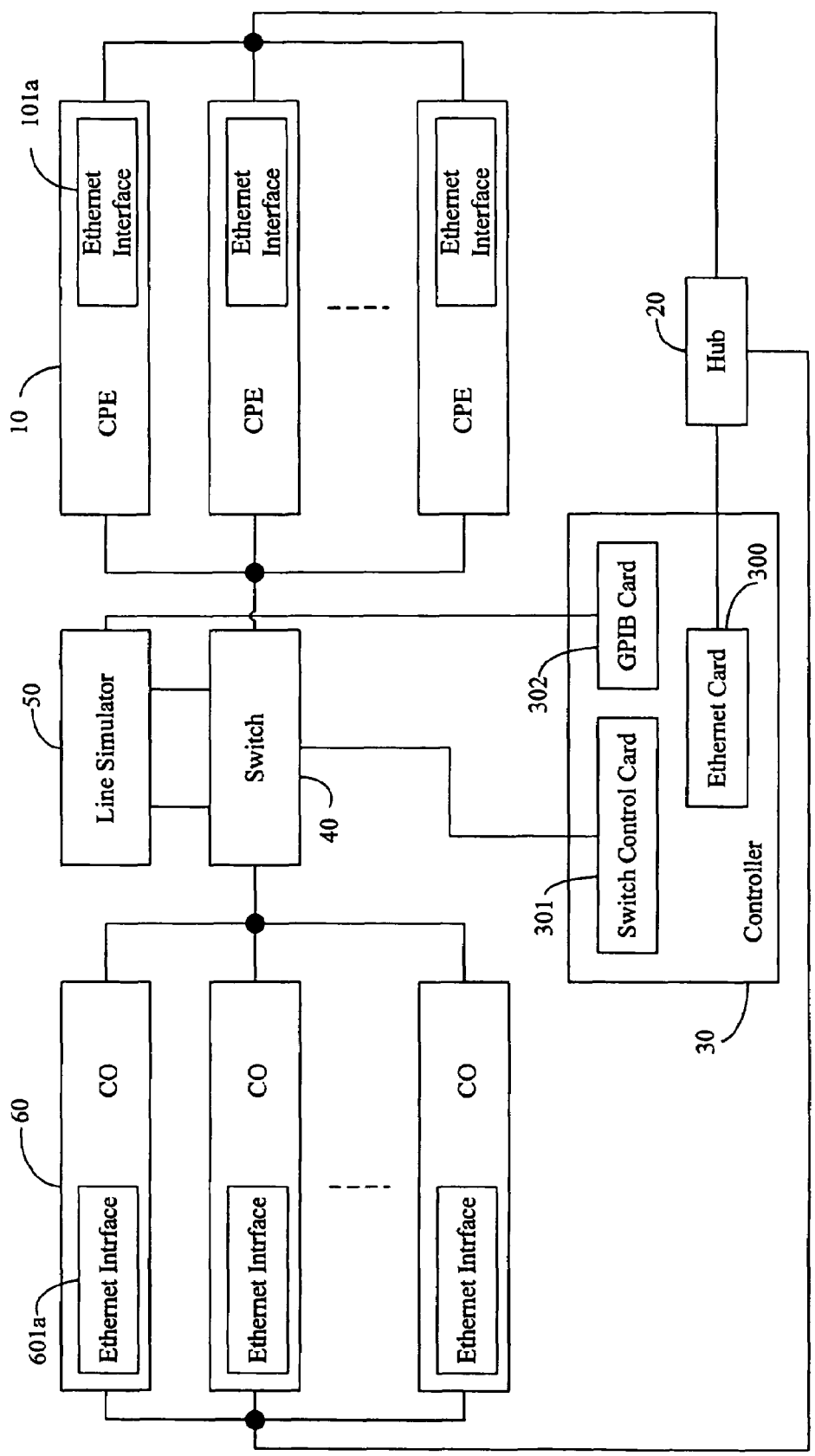
FIG. 1 is an abbreviated block diagram of architecture of a modem testing system in accordance with an exemplary embodiment of the present invention.

Referring to FIG. 1, architecture of a modem testing system in accordance with an exemplary embodiment is shown. The modem testing system is used for testing interoperability of plural or multiple COs and CPEs. The modem testing system includes a hub 20, a controller 30, a switch 40, and a line simulator 50. To further illustrate the exemplary embodiment, more detailed descriptions are provided as follows.

In the exemplary embodiment, the controller 30 may be an appropriate computer as is known in the art. The controller 30 has a hard drive, which stores several testing specifications according to various modem types. For example, if the modem testing system is used for testing ADSL (Asymmetric Digital Subscriber Line) modems, the controller 30 stores at least a TR-048 or a TR-067 specification, both of which are specified by the DSL Forum. The controller 30 includes an Ethernet card 300, a switch control card 301, and a GPIB (General Purpose Interface Bus) card 302. The controller 30 is connected to the hub 20 via the Ethernet card 300, for connecting to the CPEs 10 and the COs 60. The controller 30 controls the switch 40 via the switch control card 301 for automatically switching connections between the COs 60 and the CPEs 10, and controls the line simulator 50 via the GPIB card 302 for simulating lines such as two twisted-pair telephone lines.

In the exemplary embodiment, the switch 40 is connected to the COs 60, the CPEs 10, and the line simulator 50. The switch 40 includes a plurality of relays (not shown) controlled by the controller 30, for switching the connections between the COs 60 and the CPEs 10.

In the exemplary embodiment, the line simulator 50 is connected to the switch 40 via two twisted-pair telephone lines for communicating with the CPEs 10 and the COs 60, and simulates various types of lines and noise statuses under the control of the controller 30. For example, if the modem testing system is used for testing ADSL modems, the line simulator 50 simulates cable characteristics specified in the International Telecommunications Union-Telecommunication (ITU-T) Recommendation (Rec.) G.996.1 for 70 degrees Fahrenheit. The line simulator 50 is calibrated relative to the nominal attenuation as defined in ITU-T Rec. G.996.1. Noise can be injected through a high impedance network as specified in G.996.1, with simultaneous noise injection at both ends of the line. The noise injection is calibrated as defined in ITU-T Rec. G.996.1. Note that in G.996.1, crosstalk models are intended for injection at a single end of the line; whereas noise in the TR-048 specification is injected at both ends simultaneously in order to reduce testing time. It is understood that noise levels on short lines can be up to 3 dB.

In the exemplary embodiment, each of the CPEs 10 and the COs 60 respectively includes an Ethernet interface 101a and an Ethernet interface 601a for connecting to the hub 20. Although the COs 60 are typically manufactured by various manufacturers, the modem testing system can be used for testing the interoperability between various types of CPEs 10 and COs 60.

In the exemplary embodiment, for identifying the CPEs 10 and the COs 60, the controller 30 assigns a unique ID, such as a static and unique IP address, for each of the CPEs 10 and the COs 60. Each of the IDs corresponds to a respective one of the CPEs 10 or COs 60.

Figure 2:
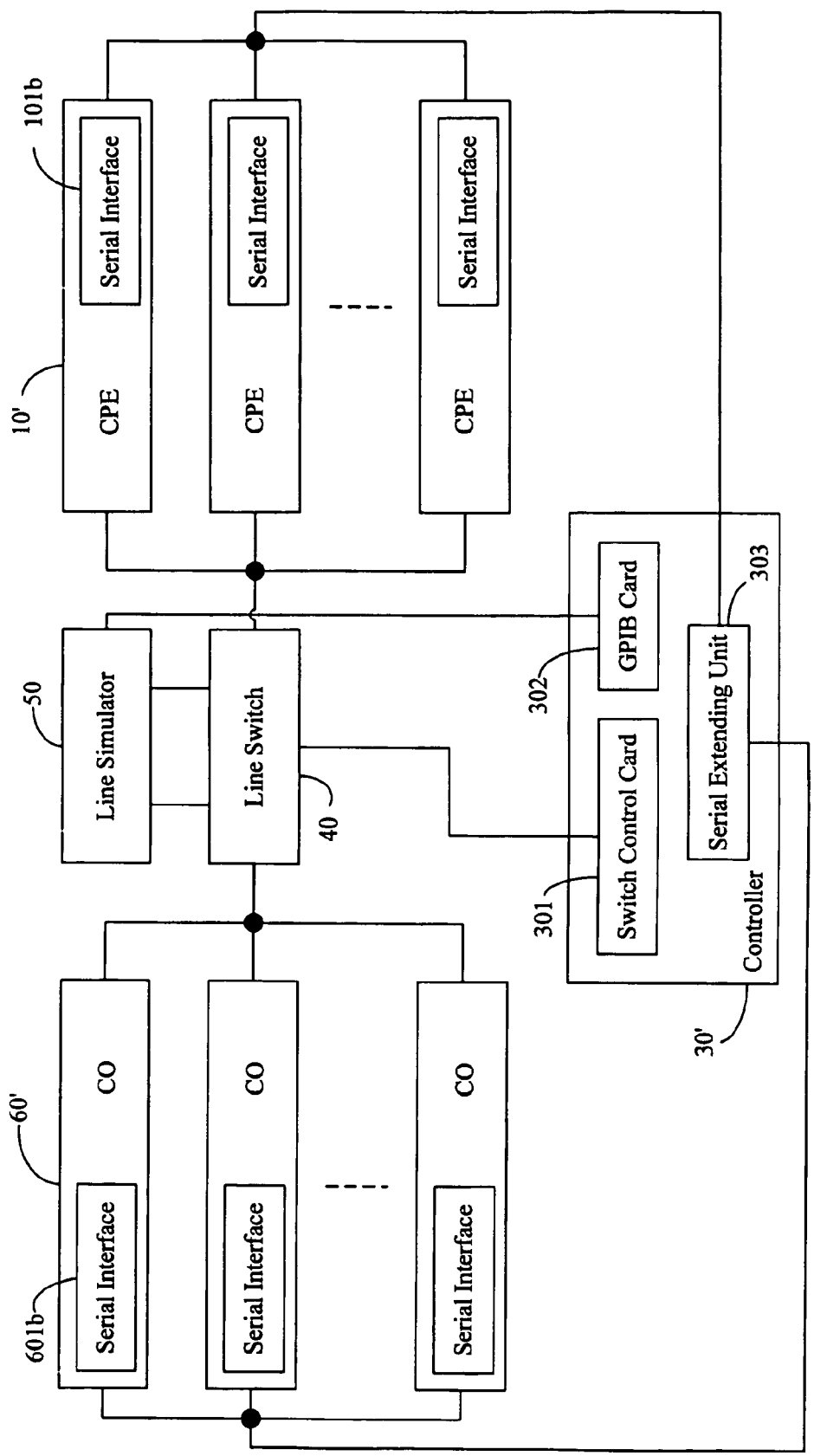
FIG. 2 is an abbreviated block diagram of architecture of a modem testing system in accordance with another exemplary embodiment of the present invention.

Referring to FIG. 2, architecture of a modem testing system in accordance with another exemplary embodiment is shown. In this exemplary embodiment, instead of having the Ethernet card 300 of the embodiment of FIG. 1, a controller 30' is connected to CPEs 10' and COs 60' via a serial extending unit 303 such as an RS-232 extending unit. For connecting to the controller 30', each of the CPEs 10' and COs 60' respectively has a serial interface 101b or 601b, such as an RS-232 interface. Other elements and configurations of this exemplary embodiment are the same as those of the embodiment of FIG. 1.

Figure 3:
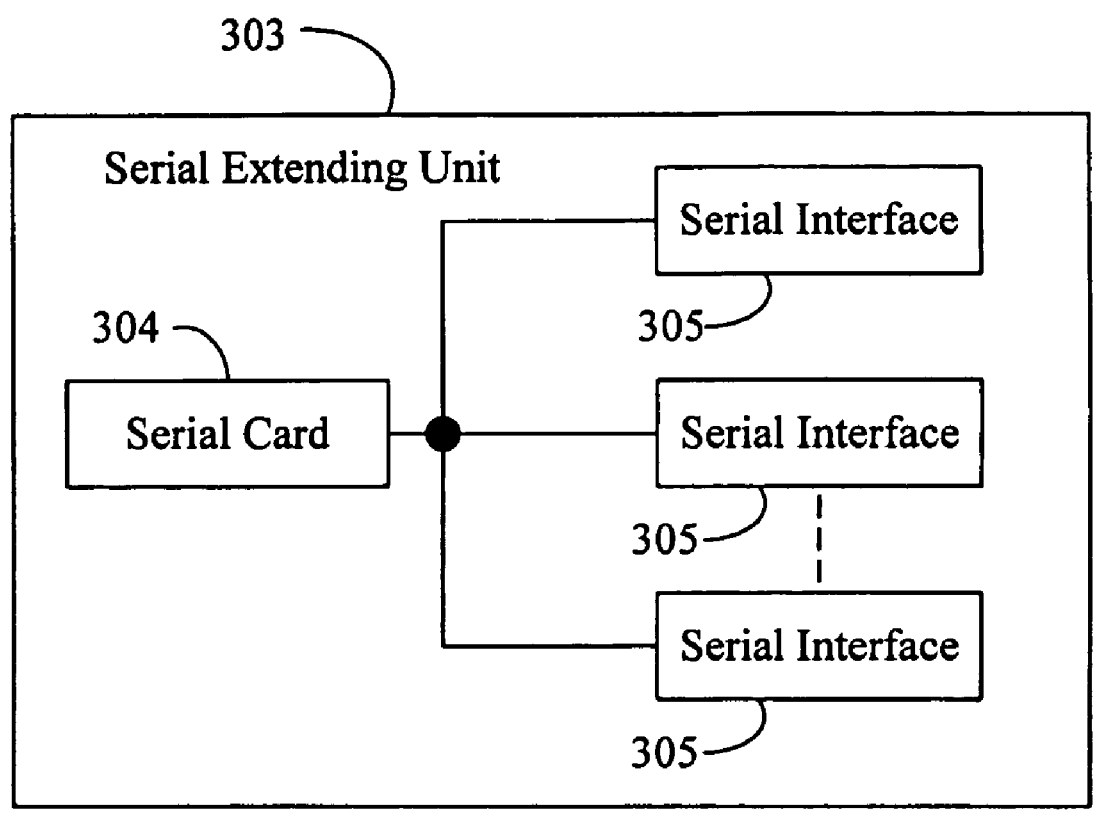
FIG. 3 is a block diagram of a serial extending unit of a controller of the modem testing system of FIG. 2.

FIG. 3 is a block diagram of the serial extending unit 303. The serial extending unit 303 includes a serial card 304 and a plurality of or multiple serial interfaces 305. The serial card 304 plugs into the PCI bus of the controller 30'. The serial interfaces 305 communicate with the serial card 304 via serial buses. Each of the serial interfaces 305 is connected to a respective one of the serial interfaces 101b of the CPEs 10' or a respective one of the serial interfaces 601b of the COs 60'. In addition, a fixed and unique ID is manually assigned for each of the serial interfaces 305. Each of the IDs corresponds to a respective one of the CPEs 10 or COs 60, according to a mapping list set up by the controller 30'.

Figure 4:
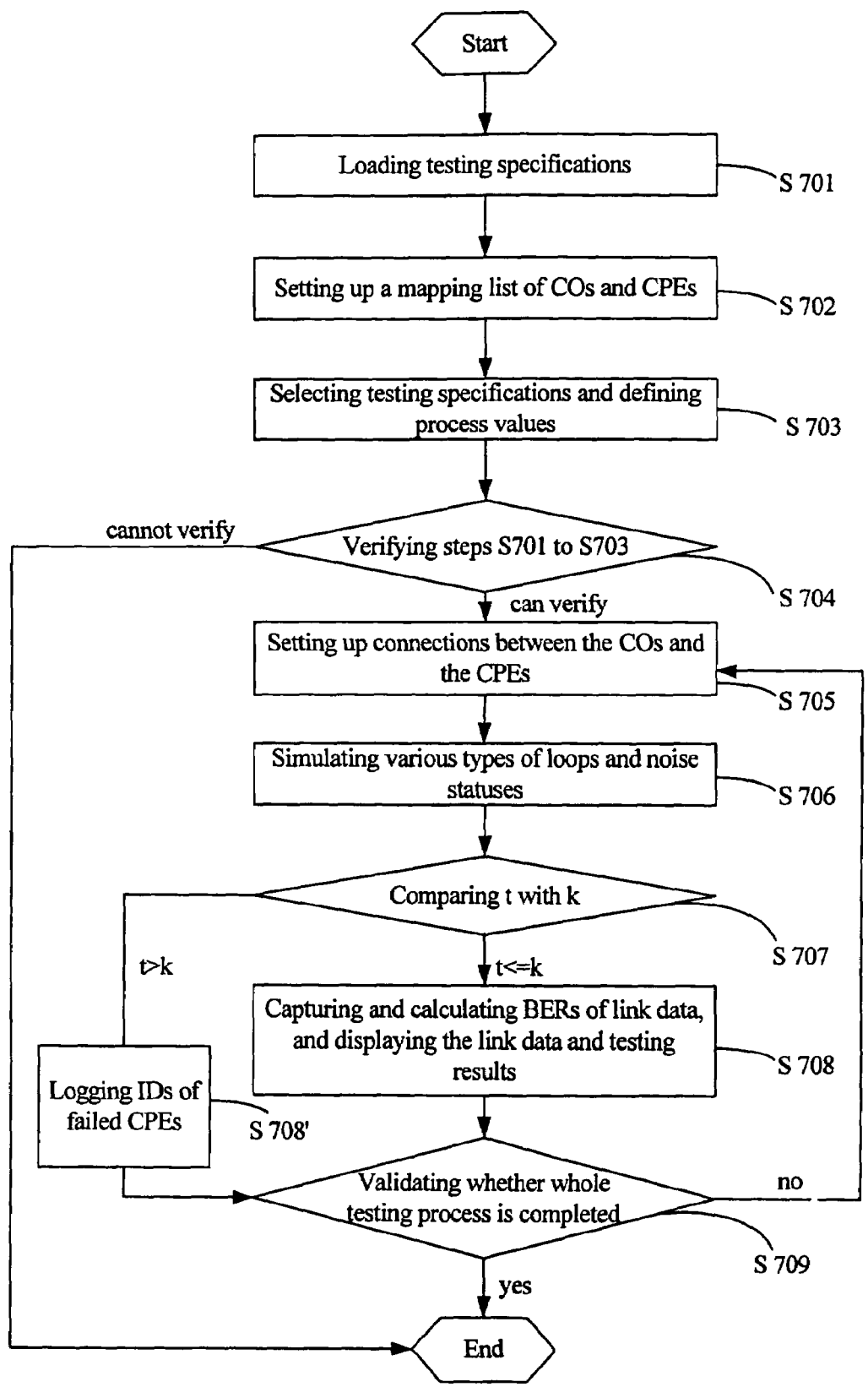
FIG. 4 is a flowchart of a modem testing method implemented using either of the modem testing systems of FIG. 1 and FIG. 2.

Referring to FIG. 4, this is a flowchart of a modem testing method implemented using either of the above-described embodiments of a modem testing system. First, in step S701, the controller 30 or 30' loads testing specifications. The testing specifications are typically based on international standards, according to the types of CPEs 10 under test. For example, if multiple ADSL modems are to be tested, at least a TR-048 or TR-067 testing specification needs to be uploaded to the controller 30 or 30'.

In step S702, the controller 30 or 30' sets up a mapping list of the CPEs 10 or 10' and COs 60 or 60'. The mapping list includes amounts of the CPEs 10 or 10' and COs 60 or 60', testing sequences of the CPEs 10 or 10' and COs 60 or 60', and the IDs of the CPEs 10 or 10' and COs 60 or 60'.

In step S703, the controller 30 or 30' selects testing specifications in accordance with the types of CPEs 10 or 10', and defines process values for controlling the testing process. The testing specifications are included in the testing specifications loaded by the controller 30 or 30' in step S701. The process values include a maximum time, represented by K, of the connections set up by the CPEs 10 and COs 60, an interval between a current testing loop and a next testing loop, whole testing loops represented by N, and a minimum time, represented by X, of lasting connections between the CPEs 10 or 10' and COs 60 or 60'. In the exemplary embodiment, N is equal to m (the amount of CPEs 10 or 10') multiplied by n (the amount of COs 60 or 60'); that is, N=m×n. In the process of testing, after a CPE 10 or 10' has finished testing, the value of N is automatically reduced by 1. If and when the value of N reaches 0, this indicates that the whole testing process is completed.

In step S704, the controller 30 or 30' verifies step S701, step S702 and step S703. That is, the controller 30 or 30' checks whether the mapping list is correctly set up, whether the correct testing specifications are selected, and whether the correct process values are defined. If there is any error or fault in performing step S701, step S702 or step S703, the controller 30 or 30' terminates the process. If there is no error or fault in performing step S701, step S702 and step S703, the process then proceeds to step S705.

In step S705, the controller 30 or 30' sets up connections between the CPEs 10 or 10' and the COs 60 or 60'. Firstly, the controller 30 or 30' sets up a connection between one of the CPEs 10 or 10' and the line simulator 50 via the switch 40, while a password of that CPE 10 or 10' is required to input into the controller 30 or 30'. Secondly, the controller 30 or 30' sets up a connection between one of the COs 60 or 60' and the line simulator 50 via the switch 40, while a password of that CO 60 or 60' is required to input into the controller 30 or 30'. A connection is thus successfully set up between one of the CPEs 10 or 10' and one of the COs 60 or 60' via the switch 40 and the line simulator 50. Similarly, other connections between other CPEs 10 or 10' and COs 60 or 60' are set up in other testing loops.

In step S706, the controller 30 or 30' controls the line simulator 50 to simulate various types of lines and noise statuses. For example, in the process of testing ADSL modems, the line simulator 50 is first required to simulate an American Wire Gauge line and a white noise. The line simulator 50 then changes the white noise to a 5T1 type noise. The 5T1 type noise is stronger than the white noise, and thus the connections between the CPEs 10 or 10' and COs 60 or 60' may be interrupted. If the connections are interrupted, the CPEs 10 or 10' under test will try to set up connections with the COs 60 or 60'.

In step S707, the controller 30 or 30' determines a successful connection time, represented by t, and compares t with K in accordance with the testing specifications selected in step S703. For example, in the process of testing ADSL modems, the maximum value of K is 60 seconds as defined in the TR-048 testing specification. If t≦K, this indicates that the CPEs 10 or 10' under test are successfully connected to the COs 60 or 60. The process then proceeds to step S708. If t>K, this indicates that the CPEs 10 or 10' under test have failed to connect to the COs 60 or 60'. The process then proceeds to step S708', where the controller 30 or 30' logs an ID or IDs of the failed CPE(s) 10 or 10'. In step S708, the controller 30 or 30' calculates BERs (Bit Error Rates) of second link data (see below). The controller 30 or 30' also displays the link data, testing results of amounts of CPEs 10 or 10' that failed the above testing process, and the ID or IDs of the failed CPE(s) 10 or 10'. The process then proceeds to step S709.

In step S709, the controller 30 or 30' checks one or more of the process values in order to validate whether the whole testing process is completed. In the exemplary embodiment, the controller 30 or 30' checks the value of N. If N=0, this indicates that the whole testing process is completed. If N>0, this indicates that the whole testing process is not completed. In the latter case, the process then goes back to step S705 to test the CPEs 10 or 10' that have not yet been tested.

Figure 5:
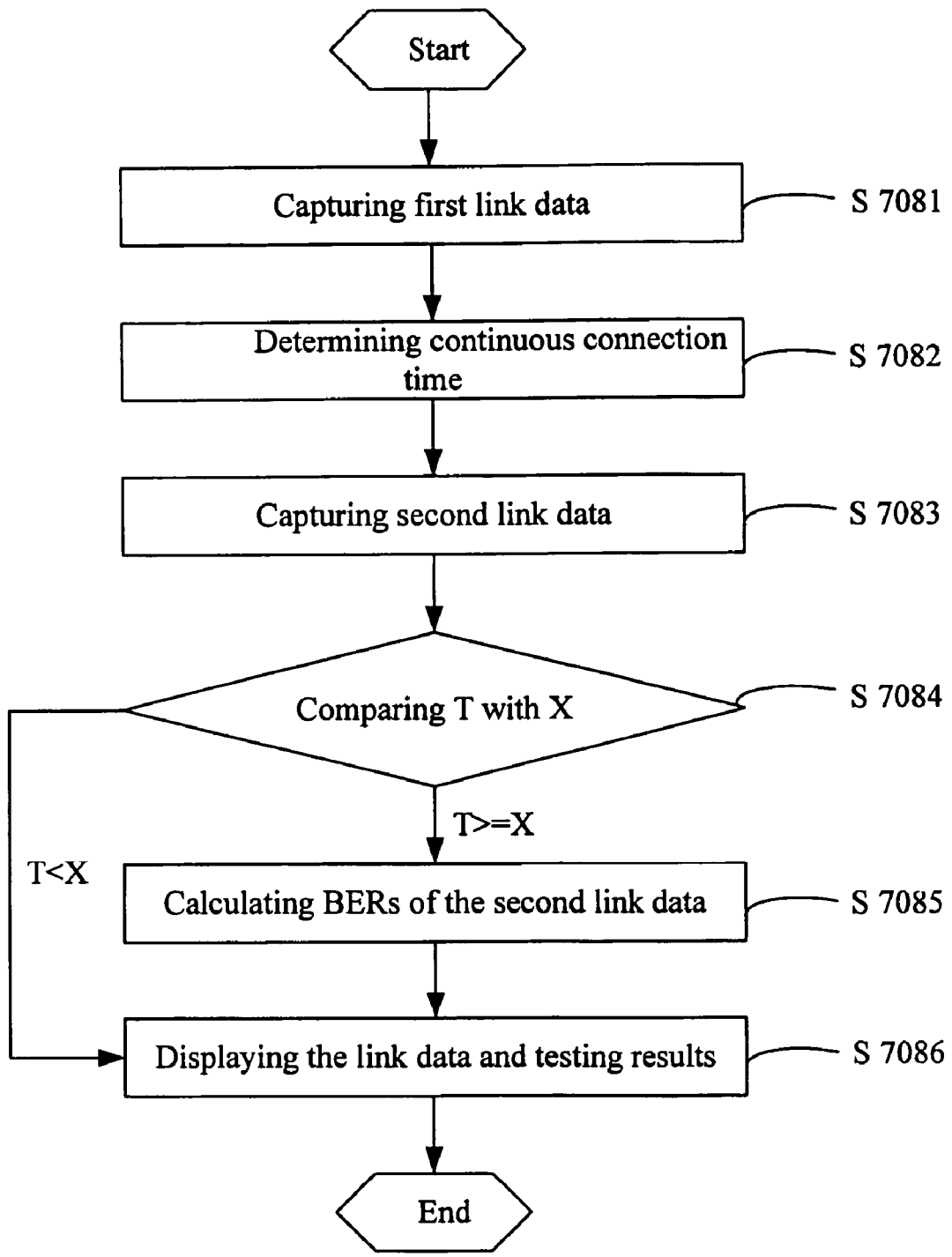
FIG. 5 is a flowchart of details of one step of FIG. 4, namely capturing and calculating BERs of link data, and displaying the link data and testing results.

Referring to FIG. 5, this is a flowchart of details of step S708, namely capturing and calculating BERs of link data, and displaying the link data and testing results.

In step S7081, the controller 30 or 30' captures first link data from the CPEs 10 or 10' and the COs 60 or 60'. The first link data includes downstream/upstream rates, SNRs (Signal to Noise Ratios), line attenuation values (in dB), and so on.

In step S7082, the controller 30 or 30' detects a continuous connection time (represented by T) between the CPEs 10 or 10' and COs 60 or 60'. The continuous connection time is calculated as being from a successful connection time to a link breaking time.

In step S7083, the controller 30 or 30' captures second link data from the CPEs 10 or 10' and COs 60 or 60'. The second link data includes CRC (Cyclic Redundancy Check) data, FEC (Forward Error Correction) data, HEC (Header Error Check) data, and so on.

In step S7084, the controller 30 or 30' compares T with a standard minimum time X. If $T \geq X$, this indicates that the connection quality between the CPEs 10 or 10' and COs 60 or 60' is poor. The process then proceeds to step S7085. If $T<X$, this indicates that the connection quality between the CPEs 10 or 10' and COs 60 or 60' meets the requirement(s) of the testing specifications, such as TR-048 and TR-067. The process then proceeds directly to step S7086.

In step S7085, the controller 30 or 30' calculates BERs of the second link data, such as the CRC data. If HEC is included in the CRC, the controller 30 or 30' calculates the BERs of the CRC data according to the formula $BER=CRC/(R*T)$. If HEC is not included in the CRC, the formula applied is $BER=(CRC+HEC)/(R*T)$. The purpose of calculating the BERs of the CRC data is to verify the connection quality between the CPEs 10 or 10' and the COs 60 or 60'. The process then proceeds to step S7086.

In step S7086, the controller 30 or 30' displays the link data including first link data and second link data, testing results of amounts of CPEs 10 or 10' that failed the above-described testing process, and an ID or IDs of the failed CPE(s) 10 or 10'. The process then proceeds to step S709 described above.

The above-described embodiments and method can be applied for testing any kind of analog or digital modems, including various types of Digital Subscriber Line (DSL) equipment.

It should be understood that various alternatives and modifications could be devised by those skilled in the art. The present invention is intended to embrace all such alternatives, modifications and variations that fall within the scope of the appended claims and their equivalents.

What is claimed is:

1. A modem testing system for testing interoperability of plural items of customer premises equipment (CPEs) and plural central offices (COs), comprising:
   a line simulator connected to the CPEs and COs, simulating various types of lines and noise statuses;
   a switch connected to the line simulator, the CPEs, and the COs, switching connections between the CPEs and the COs; and
   a controller connected to the line simulator, the switch, the CPEs, and the COs, controlling the switch to set up communications between the CPEs and the COs according to a mapping list, and controlling the line simulator to simulate various types of lines and noises statuses.

2. The modem testing system as recited in claim 1, wherein the controller captures link data from the CPEs and the COs.

3. The modem testing system as recited in claim 1, wherein the controller displays link data, and testing results of amounts of one or more CPEs that fail the testing process and one or more IDs of the failed CPEs.

4. The modem testing system as recited in claim 1, wherein the controller defines process values to control the testing process.

5. The modem testing system as recited in claim 1, further comprising a hub connected to the controller, the CPEs, and the COs.

6. The modem testing system as recited in claim 5, wherein the controller assigns a unique ID to each of the CPEs and the COs.

7. The modem testing system as recited in claim 1, wherein the controller further comprises a serial extending unit connected to the CPEs and COs.

8. The modem testing system as recited in claim 7, wherein the serial extending unit comprises a serial card, and a plurality of serial interfaces connected to the serial card respectively.

9. The modem testing system as recited in claim 8, wherein each of the serial interfaces in the serial extending unit has a unique ID.

10. A modem testing method for use in a modem testing system comprising a switch, a line simulator, and a controller, the controller controlling the switch, the line simulator, and a plurality of items of customer premises equipment (CPEs) and a plurality of central offices (COs), the modem testing method comprising:
    loading testing specifications;
    selling up a mapping list of the CPEs and the COs;
    selecting testing specifications, and defining process values;
    setting up connections between the CPEs and the COs by the switch;
    simulating various types of lines and noise statuses between the CPEs and the COs;
    capturing and calculating bit error rates (BERs) of link data;
    displaying the link data, and testing results of amounts, if any, of one or more CPEs that fail the testing process and one or more IDs of the failed CPEs; and
    checking one or more of the process values in order to validate whether the whole testing process is completed.

11. The modem testing method as recited in claim 10, wherein the mapping list comprises amounts of the CPEs and the COs, testing sequences of the CPEs, and IDs of the CPE and the COs.

12. The modem testing method as recited in claim 10, wherein the process values comprise a maximum time of connections, an interval between a current testing loop and a next testing loop, an amount of the testing loops, and a minimum time of lasting connections between the CPEs and the COs.

13. The modem testing method as recited in claim 10, further comprising:
    capturing first link data from the CPEs and the COs;
    determining continuous connection times between the CPEs and the COs;
    comparing the continuous connection times with a standard minimum time;
    capturing second link data from the CPEs and the COs;
    calculating BERs of the second link data; and
    displaying the link data and the testing results.

14. The modem testing method as recited in claim 13, wherein the first link data comprise one or more downstream rates, upstream rates, Signal to Noise Ratios (SNRs), and/or line attenuation values.

15. The modem testing method as recited in claim 14, wherein the second link data comprise cyclic redundancy check (CRC) data, forward error correction (FEC) data, and header error check (HEC) data.

16. The modem testing method as recited in claim 15, wherein the BERs are calculated according to the formula BER=CRC/(R×T).

17. The modem testing method as recited in claim 15, wherein the BERs are calculated according to the formula BER=(CRC+HEC)/(R×T).

18. A method for automatically testing multiple network devices used as customer premises equipment (CPEs) and capable of functioning via support of at least one central offices (COs), comprising the steps of:

signal-communicably connecting a plurality of central offices (COs) and a plurality of customer premises equipment (CPEs) by means of a switch;

setting up a simulator to simulate various types of lines and noise statuses between said plurality of COs and said plurality of CPEs through said switch;

controlling said switch to establish a selective connection between a selective COs out of said plurality of COs and a selective CPEs out of said plurality of CPEs;

urging said simulator to simulate said various types of lines and noise statuses through said selective connection for test purpose; and continuing said controlling onto said switch to establish a next selective connection between another selective COs out of said plurality of COs and another selective CPEs out of said plurality of CPEs.

19. The method as recited in claim 18, further comprising the below steps before said switch-controlling step:

loading testing specifications;

setting up a mapping list of said plurality of CPEs and said plurality of COs; and selecting one of said loaded testing specifications to define process values.

20. The method as recited in claim 18, further comprising the below steps after said simulator-urging step:

capturing and calculating bit error rates (BERs) of link data; and displaying said link data.

\* \* \* \* \*

UNITED STATES PATENT AND TRADEMARK OFFICE
CERTIFICATE OF CORRECTION

PATENT NO. : 7,657,418 B2  Page 1 of 1
APPLICATION NO. : 11/322871
DATED : February 2, 2010
INVENTOR(S) : Ying-Ming Liang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,657,418 B2 | Page 1 of 1 |
| APPLICATION NO. | : 11/322871 | |
| DATED | : February 2, 2010 | |
| INVENTOR(S) | : Ying-Ming Liang | |

It is certified that error appears in the above-identified patent and that said Letters Patent is hereby corrected as shown below:

Please replace Item (54) and Col. 1 line 1 regarding "Title" with the following:

Item (54) MODEM TESTING SYSTEM AND METHOD

On the Title Page:

The first or sole Notice should read --

Subject to any disclaimer, the term of this patent is extended or adjusted under 35 U.S.C. 154(b) by 1070 days.

Signed and Sealed this

Fourteenth Day of December, 2010

David J. Kappos
*Director of the United States Patent and Trademark Office*